Aug. 30, 1960     A. BLANCHARD     2,951,198

WELL LOGGING METHOD AND APPARATUS

Filed May 17, 1954

*INVENTOR.*
ANDRE BLANCHARD
BY *William R. Sherman*
HIS ATTORNEY

United States Patent Office 2,951,198
Patented Aug. 30, 1960

2,951,198

WELL LOGGING METHOD AND APPARATUS

Andre Blanchard, Houston, Tex., assignor, by mesne assignments, to Schlumberger Well Surveying Corporation, Houston, Tex., a corporation of Texas Filed May 17, 1954, Ser. No. 430,149

11 Claims. (Cl. 324—2)

This invention relates to well logging and, more particularly, to the logging of the presence of water mixed with oil in a borehole.

Oftentimes it is important to detect the presence of water in a well from which oil is being produced as a major constituent mixed with a minor proportion of water. For example, in a cased well it may be of interest to determine at which levels the perforations provide the richest oil mixture in order that other perforations may be made at these levels. Again, it may be desirable to find the level of a water seepage into a producing well. In view of the circulation of fluids within a producing well, it is desirable to make these detections and measurements in situ, that is, in the borehole at the point where the presence and character of an oil-water mixture is to be determined.

Accordingly, it is an object of this invention to provide new and improved methods and apparatus for detecting the presence of water in mixture with oil in a well.

It is another object of this invention to determine the proportions of oil and water in a mixture within a well and to provide an indication of this determination at the surface of the earth.

Yet another object of this invention is to obtain a continuous record of values representative of the ratio between the water volume and the oil volume in a mixture of oil and water measured at successive levels in a borehole.

Still another object of this invention is to determine this ratio by sampling only a limited portion of the oil and water mixture at successive levels and testing the sampled portion.

These and other objects of this invention are attained by continuously introducing representative samples of the well fluid consisting of water and oil in unknown proportions into an emulsifier in a housing arranged to traverse a borehole and passing the emulsified mixture of water and oil between the electrodes of a capacitor forming a portion of a measuring circuit connected with a recorder. In a preferred embodiment, both chemical and mechanical emulsification are employed to disperse relatively conductive water in oil as a vehicle. This emulsion is caused to flow between the plates of a multiple plate capacitor arranged within the housing and connected to a capacity sensitive detecting device such as a bridge or the tank circuit of an oscillator. A signal representative of the variations in capacity and, hence, in the dielectric constant of the emulsion is transmitted to the surface of the earth where it may conveniently be recorded as a function of the depth of the measuring apparatus in the borehole. As the dielectric constant of the emulsified mixture is substantially a linear function of the ratio of water to oil, this ratio may be determined from the recorded signal.

The invention and others of its advantages and objects will more clearly be perceived from the following detailed description taken in conjunction with the drawings, in which.

Figure 1:
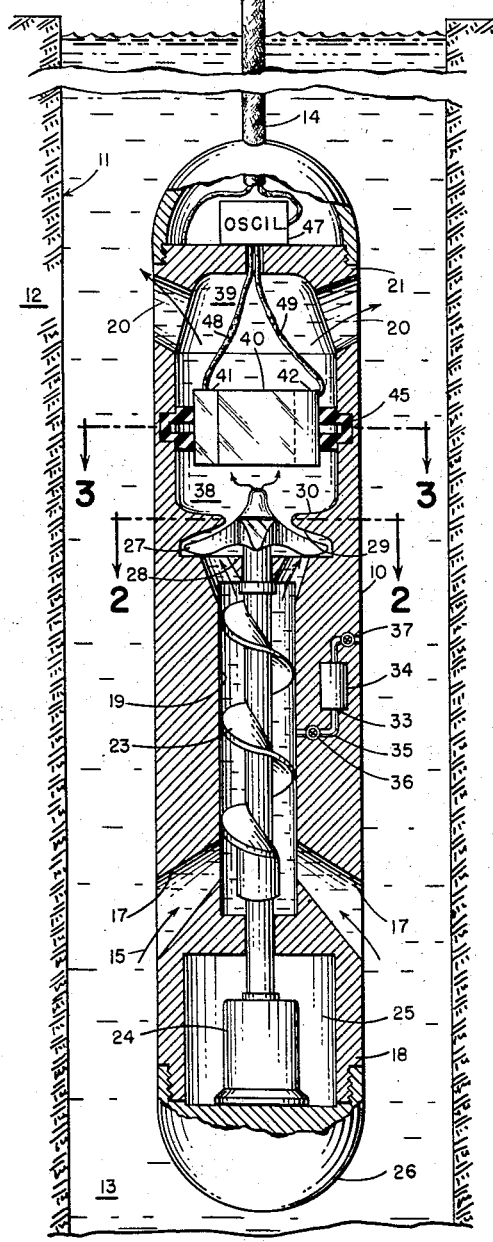
Fig. 1 is an elevational view, partially in section and partially diagrammatic, of the apparatus of this invention, the section being taken on a diametral plane of the cylindrical housing.

It will be helpful to an understanding of this invention to consider the theory underlying the dielectric properties of emulsions, although the brief exposition here given is not to be taken as limiting in any manner the scope of the invention to be described. This exposition will be limited to the case of water suspended in an oil vehicle with a normal rather than an exceptionally fine degree of dispersion. Under these conditions, which will be met in the usual application of this invention, the dielectric constant of a water in oil emulsion is a function of the dielectric constant of oil, of the dielectric constant of water and of the ratio oil to water. The dielectric constant of water is high (order of magnitude 80) and, moreover, the water to be found in an oil well will always have enough conductivity so that its dielectric constant will appear as almost infinite, except at extremely high frequencies which will not be used in this application. The dielectric constant of oil is low. Under these conditions no other factor is significant to the value of the dielectric constant of the water in oil emulsion than the dielectric constant of oil and the proportion of water to oil. There are theoretical formulae relating the dielectric constant of the dispersion of a conducting medium like water in an insulating medium of given dielectric constant like oil, but reliance may be placed upon an experimental determination of this relation obtained by laboratory measurements. Accordingly, the measure of the dielectric constant for the emulsion will be a reliable indication of the proportion of water to oil in the emulsion. This measurement may be undertaken then without regard to the size of the suspended water droplets, if not extremely fine, and without regard to the electrical conductivity of the conductive waters which may be found in an oil well.

With these considerations in mind, there is provided an elongated housing 10 arranged to travel in a borehole 11 through formations 12 which are productive of oil and to some extent water in a mixture 13 within the borehole 11. The housing 10 is supported for movement through the borehole by means of a cable 14 extending to a winch (not shown) at the surface of the earth.

In order to take measurements at various successive levels in a borehole without appreciably disturbing the steady state conditions of the mixture occurring prior to the measurement, the housing 10 is arranged continuously to sample a portion 15 of the mixture while moving in a downward direction through the borehole. It is thus provided with downwardly opening ports 17 at its lower end 18 which communicate interiorly with a duct 19 extending axially of the housing toward outlet ports 20 at the upper end 21 of the housing.

Figure 2:
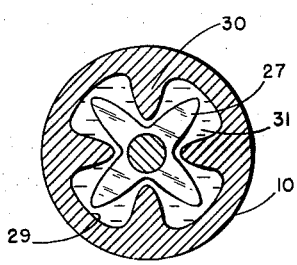
Fig. 2 is a sectional view taken along the line 2—2 of Fig. 1 to illustrate the relationship of the agitator and shroud of the mechanical emulsifier.

To homogenize the sampled portion of this mixture of oil and water entering the ports 17 and at the same time to promote the flow of this sampled portion 15 through the housing for a detection of the presence of water, a worm shaft 23 driven by an electric motor 24 is arranged as a helical rotor of a pump to rotate within the duct 19 in a direction to advance the sampled portion 15 toward the outlet ports 20. The motor 24 may conveniently be located in a chamber 25 at the end 18 of the housing closed by means of a threaded cap 26. This motor 24 also drives an agitator 27 supported by a bearing 28 within a shroud 29 formed by suitably relieving the walls at the upper end of the duct 19. To obtain a sufficient degree of dispersion of the water in the oil, the agitator 27 may be of the four-bladed type running quite close to four fixed blades 30 arranged as may be seen in Fig. 2 in inwardly opposing fashion across outlet 31 of the shroud 29.

As a result, a substantially uniform mixture obtained by the action of the worm shaft 23 is transformed into an emulsion of water suspended in oil by the cooperative action of impeller 27 and the bladed shroud 29. To assist in this mechanical action and to obtain a water-in-oil emulsification particularly when the volumetric proportion of water to oil is high, an arrangement is made for adding a chemical emulsifier to the mixture, preferably in the duct 19 where the mixture is rendered homogeneous. Typical surface active emulsifying agents which promote the water-in-oil type of emulsion are the fatty acids, the fatty alcohols, sterols, ethyl cellulose, and oil-modified alkyd resins. These agents are enumerated, not by way of limitation, but to illustrate that a large class of agents is available having the physical effect of promoting water-in-oil type of emulsions. An injector 33 suitable for introducing such an emulsifying agent into the mixture 13 is shown disposed in the housing 10 having a reservoir 34 communicating with the duct 19 by means of a conduit 35 having a valve 36 therein. The valve 36 permits regulation of emission of the emulsifying agent into the mixture 13 so that relatively small amounts of this agent may be injected continuously. Filling of the reservoir 34, under pressure if desired, may be accomplished through a valved conduit 37.

Figure 3:
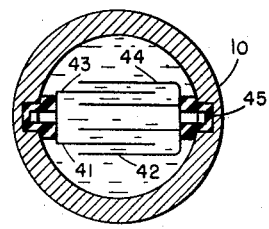
Fig. 3 is a sectional view taken along the line 3—3 of Fig. 1 to illustrate the channels between the interleaved plates of an electrical capacitor.

After the mixture 13 has been sufficiently emulsified with the relatively conductive water dispersed in the relatively non-conducting oil, this emulsion identified at 38 passes into a chamber 39 containing an electrical capacitor 40. As seen in Figs. 1 and 3, the capacitor 40 has two electrodes 41 and 42 each comprising a series of parallel plates 43 and 44 alternately interleaved. These plates 43 and 44 extend in the direction of flow from the impeller 27 to the outlet ports 20, so that the emulsion may fill and pass freely through the space between the plates 43 and 44 and thus between the electrodes 41 and 42. The entire capacitor 40 is mounted within the chamber 39 by means of insulating bushings 45.

It will be recalled that the capacitance of an electrical capacitor depends not only upon its configuration, but also bears a direct relation to the dielectric constant of the medium in the space between the electrodes. A measurement of the dielectric constant for the emulsion flowing through the capacitor 40 with its fixed configuration may accordingly be obtained by determining its capacitance when the emulsion is flowing between its electrodes. Numerous means for measuring capacitance are of course well known, such as bridge circuits, ballistic galvanometers, and oscillators having their frequency determined by the capacitance in their tank circuit. For purposes of this description, an oscillator 47 is shown disposed in the top 21 of the housing 10 with conductors 48 and 49 connecting respectively with electrodes 41 and 42 to place the capacitor 40 in an energized circuit with this oscillator 47 as, for example, in its tank circuit. The output of the oscillator 47, which may be converted from a signal varying in frequency to one varying in amplitude, is connected by conductors 50 and 51 extending to the surface of the earth through the cable 14 to a recorder 52. Preferably, the oscillator 47 is arranged to operate at sufficiently high frequencies that the conduction currents between electrodes 41 and 42 are negligible in relation to the quite substantial capacitive currents, this result being obtained, for example, with frequencies in the upper audio- or lower radio-frequency ranges. For purposes of correlation with conventional electrical logs, the recorder 52 provides a record 53 of the volumetric fractions of water in oil as a function of the depth of housing 10 in the borehole.

Motor 24 may be powered by a source of current 55 at the surface of the earth connected by conductors 56 and 57 extending down through the cable 14.

In operation, the housing 10 is lowered at a desired rate past the levels to be investigated and the motor 24 is energized. The speed of the motor 24 is preferably adjusted in relation to the rate of lowering the housing so that the sampled portion 15 of the mixture 13 at a given level will reach the capacitor 40 when the capacitor 40 has been lowered to this same level, in other words, so that the average rate of upward flow of the mixture through the duct 19 is generally equal to the rate of the downward movement of the housing 10. During this downward travel of the housing, the readings obtained on the recorder 52 will appear on the record 53 as a representation of the volumetric fraction of water to oil at the level of the condenser 40 in the borehole 11.

Because the capacitor 40 is within the housing 10, the apparatus is not affected by the dielectric constant of adjacent formations, yet the record 53 may be interpreted to ascertain the formation which is introducing water into a borehole. The arrangement for passing the sampled portion 15 through the interior of the housing 10 also permits a better control of the emulsification of the oil and water mixture, particularly as to uniformity of the emulsion. Moreover, as the inlet ports 17 will restrict the portion of the mixture that is sampled, the amount of water-in-oil emulsion produced during a run will not appreciably hinder subsequent processing of the oil.

It will be apparent that other means for mechanically and/or chemically emulsifying the oil and water mixture might be employed within the purview of this invention. Likewise, other electrode configurations could be employed with equivalent results. Accordingly, these and other modifications lying within the true scope and spirit of this invention are intended to be included within the ambit of the appended claims.

I claim:

1. In apparatus for detecting the presence of water mixed with oil in a borehole, the combination comprising a housing arranged for travel through said borehole and having a longitudinal passage therethrough, chemical injector means in fluid communication with said passage, agitator means in said passage for emulsifying a mixture of oil and water in said borehole electrodes carried by said housing and arranged to receive the emulsified mixture therebetween, and means for detecting variations in the capacitance of said electrodes.

2. In apparatus for measuring the volumetric fraction of water in an oil and water mixture within a borehole, the combination comprising a housing having a passage for conduction of a mixture of oil and water therethrough during travel of said housing in the borehole, means for introducing a chemical emulsifier into said passage of the type productive of water-in-oil emulsions, electrodes carried interiorly of said housing arranged to receive the emulsified mixture therebetween, and means for detecting variations in the capacitance of said electrodes.

3. In apparatus for measuring the volumetric fraction of water in an oil and water mixture within a borehole, the combination comprising a housing having a passage therethrough, an homogenizer and an agitator and a capacitor arranged in series along said passage successively to receive and act upon an oil and water mixture, means for injecting an emulsifying agent into said homogenizer to promote a water-in-oil emulsion and means for detecting variations in the capacitance of said capacitor.

4. In apparatus for measuring the volumetric fraction of water in an oil and water mixture within a borehole, the combination comprising a housing having a passage therethrough and arranged for travel through a borehole, a homogenizer and an agitator and a capacitor arranged in series in said passage successively to receive an oil and water mixture, common drive means for said homogenizer and said agitator to promote the flow of the mixture, means for injecting a chemical emulsifier into said homogenizer of the type productive of water-in-oil emulsions, means for detecting variations in the capacitance of said capacitor, and means for recording said variations upon a scale representative of the volumetric fraction of water in the oil and water mixture as a function of the depth of said condenser in the borehole.

5. A method of detecting variations in the volumetric fraction of water in an oil and water mixture within a borehole, comprising the steps of separating a portion of such mixture at successive levels in a borehole, homogenizing such portion, chemically and mechanically emulsifying said portion to form a water-in-oil emulsion, flowing such emulsified portion through a capacitor, obtaining a signal corresponding to variations in the capacitance of said capacitor, and recording said signal as a function of the level in the borehole.

6. In apparatus for detecting the level of fluid entry into a borehole, the combination comprising a housing having a longitudinal passage therethrough, means for moving said housing through the borehole at a given speed, pump means including a helical rotor disposed rotatively in a cavity defined by said passage for pumping well fluid through said passage at said given speed and in a direction opposite to movement of said housing, whereby the fluid in said passage is substantially free of longitudinal movement relative to the borehole, means for injecting a chemical agent into said cavity to be mixed homogeneously with said fluid by said rotor, electrical detecting means responsive to a property of said fluid rendered detectable by said agent for developing a signal varying as a function of said property, and means for recording variations in said signal as a function of the depth of said housing in the borehole.

7. In the testing of an oil stream known to contain water, the steps of agitating the stream, injecting an emulsifying agent therein to form a temporarily stable emulsion of the oil and water, and measuring the electrical capacity of such emulsion.

8. In the testing of a stream containing major and minor portions of oil and water, the steps of agitating the stream, injecting an emulsifying agent therein of a type to produce an emulsion of such minor portion in such major portion, and measuring the electrical capacity of such emulsion.

9. The method of detecting points of water entry in a producing well, which comprises the steps of surveying the productive intervals of the well with capacitance-forming electrodes, adding a small amount of an emulsifying agent to the fluid stream and mixing the same in advance of such electrodes, thereby to convert the stream portion between the electrodes to a temporarily stable oil and water emulsion, and measuring the dielectric constant of the thus emulsified stream.

10. The method of logging a well producing major and minor portions of oil and water to detect the points of water entry, which comprises the steps of surveying the productive intervals of the well with capacitance-forming electrodes, agitating the produced fluid stream immediately in advance of such electrodes, adding to the agitated stream a small amount of an emulsifying agent of a type to produce a temporary stable emulsion of such minor portion in such major portion, and measuring the dielectric constant of the thus produced emulsion by means of such electrodes.

11. Apparatus for detecting the properties of fluids in a well comprising an elongated housing having a longitudinal passage therethrough open at either end, means for moving said housing through the borehole at a given speed, pump means including a helical rotor supported rotatably along said passage for pumping well fluid through said passage at said given speed and in a direction opposite to movement of said housing, whereby fluid in said passage at a given level in the well may be representative of the fluid at such level before its entry into said passage, emulsifying means including an impeller rotatably supported in said passage downstream from said rotor and mechanically coupled with said rotor for rotation therewith to emulsify fluid pumped through said passage, electrical detecting means supported along said passage downstream from said impeller and responsive to a property of said emulsified fluid for developing a signal varying as a function of said property, and means for recording variations in said signal as a function of the depth of said housing in the borehole.

References Cited in the file of this patent

UNITED STATES PATENTS

| | | |
|---|---|---|
| 1,960,168 | Schoenberg | May 22, 1934 |
| 2,330,394 | Stuart | Sept. 28, 1943 |
| 2,342,827 | Ackers | Feb. 29, 1944 |
| 2,379,106 | Sanders | June 26, 1945 |
| 2,540,146 | Stober | Feb. 6, 1951 |
| 2,569,625 | Wyllie | Oct. 2, 1951 |
| 2,599,583 | Robinson et al. | June 10, 1952 |
| 2,623,928 | Bower | Dec. 30, 1952 |
| 2,722,657 | Janssen | Nov. 1, 1955 |